(12) United States Patent
Ben-Mansour et al.

(10) Patent No.: US 7,392,710 B1
(45) Date of Patent: Jul. 1, 2008

(54) FLOW METER PROBE WITH FORCE SENSORS

(75) Inventors: Rached Ben-Mansour, Dhahran (SA); Muhammad A. Hawwa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 61 days.

(21) Appl. No.: 11/650,987

(22) Filed: Jan. 9, 2007

(51) Int. Cl.
*G01F 1/38* (2006.01)
*G01L 9/06* (2006.01)
*G01D 21/00* (2006.01)

(52) U.S. Cl. ................... 73/861.47; 73/727; 73/866.5
(58) Field of Classification Search ............. 73/861.47, 73/866.5
See application file for complete search history.

(56) References Cited

U.S. PATENT DOCUMENTS

| | | | |
|---|---|---|---|
| 3,699,811 A | 10/1972 | Maiden et al. | |
| 3,878,714 A * | 4/1975 | Protta et al. | 73/170.02 |
| 3,977,249 A | 8/1976 | Wittig | |
| 4,165,654 A * | 8/1979 | Hammitt et al. | 73/723 |
| 4,615,214 A | 10/1986 | Burns | |
| 4,788,869 A | 12/1988 | Li | |
| 4,836,019 A | 6/1989 | Hagen et al. | |
| 5,101,669 A | 4/1992 | Holm-Kennedy et al. | |
| 5,146,083 A * | 9/1992 | Zuckerwar et al. | 73/705 |
| 5,423,209 A | 6/1995 | Nakaya et al. | |
| 5,929,331 A | 7/1999 | Kinser et al. | |
| 6,176,130 B1 | 1/2001 | Nakaya et al. | |
| 6,230,557 B1 * | 5/2001 | Ciglenec et al. | 73/152.01 |
| 6,336,060 B1 | 1/2002 | Shigemi et al. | |
| 6,370,949 B1 | 4/2002 | Zyski et al. | |
| 6,557,423 B1 | 5/2003 | Vozhdaev et al. | |
| 6,666,081 B1 * | 12/2003 | Babinsky et al. | 73/170.01 |
| 7,010,970 B2 | 3/2006 | Rediniotis et al. | |
| 7,152,466 B2 * | 12/2006 | Ramakrishnan et al. | 73/152.51 |
| 2006/0060001 A1 | 3/2006 | Kurtz et al. | |

OTHER PUBLICATIONS

Watkins et al., "The Development and Use of Dynamic Pressure Probes With Extended Cones of Acceptance," 15th Australasian Fluid Mechanics Conference, Sydney, Australia, Dec. 2004.

* cited by examiner

*Primary Examiner*—Harshad Patel
(74) *Attorney, Agent, or Firm*—Richard C. Litman (57) ABSTRACT

The flow meter probe with force sensors has the body of a frustum of a regular pyramid with a force sensor disposed upon each face. The force sensors are mounted in bores defined in the probe body and include a pin that may be displaced in the bore to exert pressure on an electrical transducer. The transducer may be a ceramic, piezoelectric sensor or a Micro-Electro-Mechanical System (MEMS) sensor. The pin has an aerodynamically- or hydrodynamically-shaped head, a cylindrical body, and a frustoconical tail to concentrate force exerted upon the sensor. The head of the pin protrudes slightly above the face of the probe body so that aerodynamic and hydrodynamic forces are exerted directly against the pin, and pin displacement measures the forces directly. A plurality of probes may be placed in the path of fluid flow in a variety of configurations, as desired.

20 Claims, 9 Drawing Sheets

FLOW METER PROBE WITH FORCE SENSORS

BACKGROUND OF THE INVENTION

1. Field of the Invention

The present invention relates to probes for measuring the velocity vector of a fluid flow, which may be a gas flow or a liquid flow, and particularly to a flow meter probe with force sensors that uses aerodynamic or hydrodynamic force sensors instead of pressure sensors.

2. Description of the Related Art

The measurement of velocity vectors in fluid flow fields is of critical importance for several applications, including the operation and monitoring of petrochemical plants, weather monitoring and forecast, air-transportation traffic control, electronic cooling, and several biomedical engineering applications. A number of flow measurement techniques have been used by researchers, including Laser-Doppler Velocimetry, Particle Image Velocimetry, multi-hole pressure probes, thermal anemometry using hot wires and hot films, etc.

Of these devices, multi-hole pressure probes are the more practical, relatively easy to use, and cost effective tools. Despite their advantages, the multi-hole probes suffer a few disadvantages, including: (i) a requirement of relatively clean fluid to avoid clogging the holes; (ii) most probes have been adopted for air-flows, while some have been modified for water with limited capabilities; (iii) limitations on fluid temperature operation; and (iv) as the pressure hole size is decreased for miniaturization purposes, the probes have a limited frequency response.

Multi-hole pressure probes are generally of the pitot tube variety, with multiple tubes extending between pressure sensing ports in the tip and sides of the probe to a pressure transducer in the body of the probe for measuring the total pressure and stagnation pressure. By Bernouli's equation, the total pressure $p_t$ is equal to the static pressure $p_s$ plus the dynamic pressure:

$$p_s + \frac{1}{2}\rho V^2 = p_t \quad (1)$$

where $\rho$ is the density and $V$ is the velocity. Equation (1) can then be solved for the velocity as follows:

$$V^2 = \frac{2(p_t - p_s)}{\rho} \quad (2)$$

However, because of the length of the tubing, conventional multi-hole probes do not have a rapid response time, which limits their use where the velocity of fluid flow is changing rapidly. In addition, the magnitude of the response is attenuated.

Thus, a flow meter probe with force sensors solving the aforementioned problems is desired.

SUMMARY OF THE INVENTION

The flow meter probe with force sensors has the body of a frustum of a regular pyramid with a force sensor disposed upon each face. The force sensors are mounted in bores defined in the probe body and include a pin that may be displaced in the bore to exert pressure on an electrical transducer. The transducer may be a ceramic, piezoelectric sensor or a Micro-Electro-Mechanical System (MEMS) sensor. The pin has an aerodynamically- or hydrodynamically-shaped head, a cylindrical body, and a frustoconical tail to concentrate force exerted upon the sensor. The head of the pin protrudes slightly above the face of the probe body so that aerodynamic and hydrodynamic forces are exerted directly against the pin, and pin displacement measures the forces directly. A plurality of probes may be placed in the path of fluid flow in a variety of configurations, as desired.

The probe body may be a frustum of a triangular pyramid, having four faces with a force sensor disposed in each face; a frustum of a square or rectangular pyramid, having five faces with a force sensor disposed in each face; or a frustum of a regular pyramid having a polygonal base of any desired number of sides, with each face having a force sensor disposed therein.

The pin head has a shallow, concave central recess formed therein in order to increase pressure drag force and to minimize eddy production, cavitation, and flow disturbances. The body of the pin may be cylindrical. When the transducer is a ceramic sensor, the body may be disposed in a cylindrical gasket to ensure rectilinear pin movement and to provide sealing, and may have an O-ring at the top of the gasket to provide further sealing. The pin body may be a somewhat flexible, lubricated element, and the head of the pin may be raised above the gasket and the face of the probe body by a micromillimeter-sized gap. When the transducer is a MEMS sensor, the body of the pin may be disposed within a cylindrical mechanical spring, the head of the pin having a peripheral flange supported on the top of the spring.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a flow meter probe with force sensors for determining the velocity vector and other flow parameters of either a gaseous or a liquid medium. The probe design is based upon the concept of fluid flow dynamic force (aerodynamic, hydrodynamic, etc.) sensing.

Any moving fluid, whether gas or liquid, exerts a dynamic force on any "obstacle" within the flow field. The amount or magnitude of the fluid dynamic force is, in general, proportional to $(\frac{1}{2}) \rho\, v^2$, where $\rho$ is the fluid density and $V$ is the magnitude of the velocity vector. Ideally, in order to determine the fluid velocity vector $V=(u, v, w)$ with three space components u, v and w, a system composed of three force sensors, which are strategically placed to face at least three mutually orthogonal directions corresponding to the force and velocity vector components, should be enough to deduce the velocity vector components. For practical reasons, more force sensors will be needed to be able to obtain the unknown velocity vector field covering all possible directions (all around a 360° angle).

The force sensors should be small enough (or even imbedded) to minimize disturbance of the measured flow parameters. After measuring the fluid flow force at four or more locations of the flow field, the three vector components of velocity are deduced from rigorous calibration of the probe. The proper choice of force sensors with good dynamic response will enable the probe to obtain a real time velocity vector with an acceptable frequency response. Proper statistical analysis of the data (by conventional data analysis techniques well known to those skilled in the art, and therefore not discussed herein) will result in determination of the velocity fluctuations, and hence all turbulence quantities required.

Figure 1A:
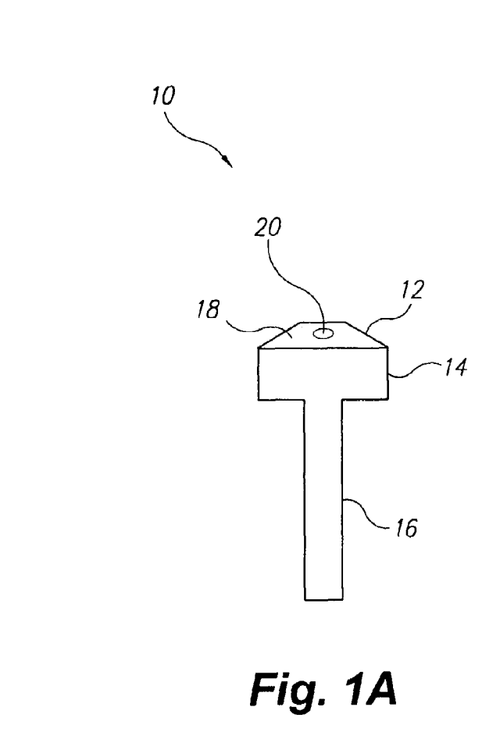
FIG. 1A is a side view of a flow meter probe with force sensors according to the present invention.
Figure 1B:
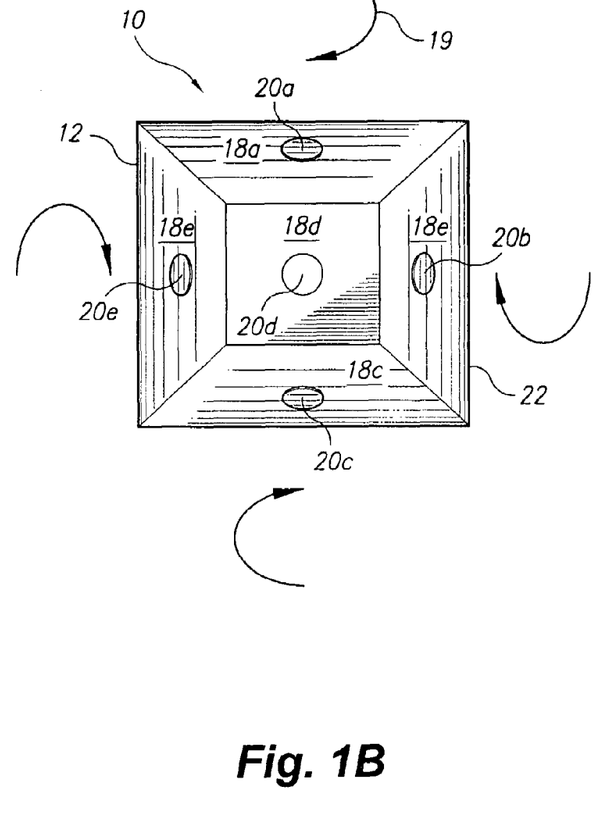
FIG. 1B is a top view of a flow meter probe with force sensors according to the present invention.

FIGS. 1A and 1B show an exemplary flow meter probe with force sensors, designated generally as 10 in the drawings, according to the present invention. The probe 10 has a body 12 having the shape of a frustum of a regular pyramid, in this case, a square or rectangular pyramid. The probe body 12 is mounted on a platform 14 supported by a shaft 16. The platform 14 and shaft 16 may be hollow in order to house a printed circuit board and other electrical components associated with the sensors, and to act as a conduit for wiring or cables connecting the probe 10 to a data processor or the like.

Figure 2:
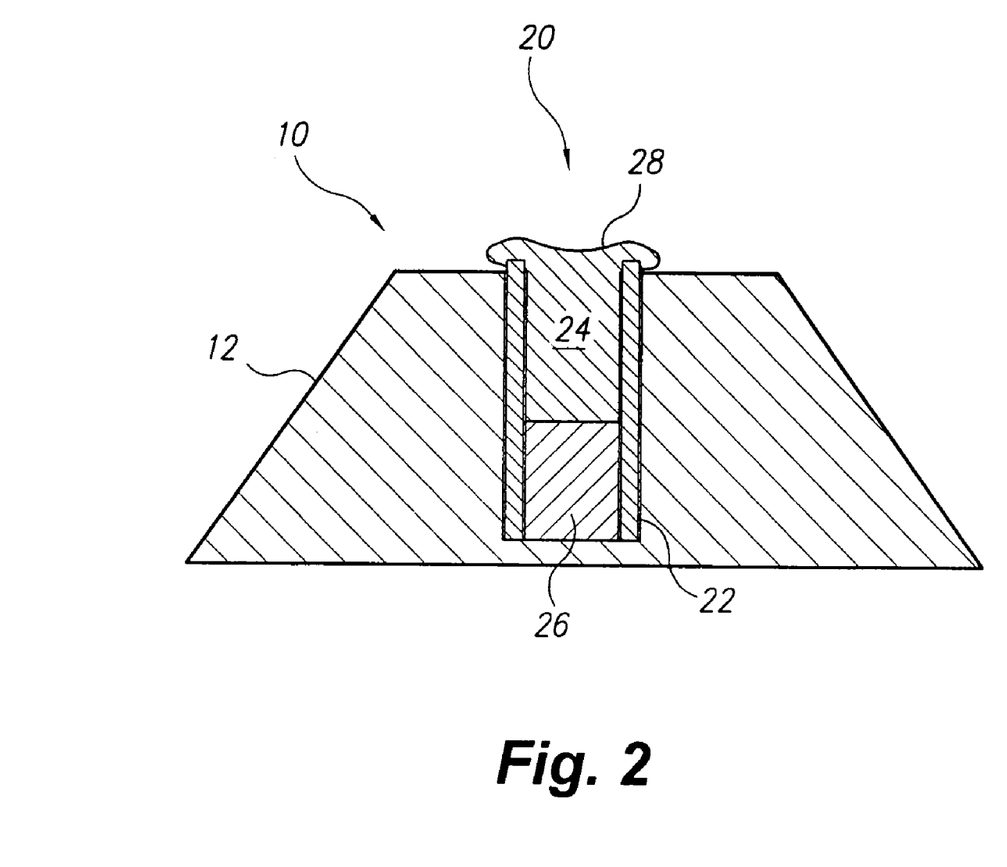
FIG. 2 is a diagrammatic side view in section of a flow meter probe with force sensors according to the present invention.

The probe body 12 has five faces 18 exposed to the flow field, indicated by arrows 19. Each face, designated individually as 18a, 18b, 18c, 18d, and 18e in FIG. 1B, has an independent force sensor 20 (designated individually as sensors 20a, 20b, 20c, 20d and 20e in FIG. 1B) mounted therein. Referring to FIG. 2, it is shown diagrammatically that each force sensor 20 is disposed in a bore 22 defined in probe body 12, which may be solid or hollow, as desired. Each force sensor 20 includes a pin 24 slidable in bore 22 and a transducer 26 disposed below the pin 24. The pin 24 has a head 28 that is at, or slightly above, the surface of face 18.

Figure 3:
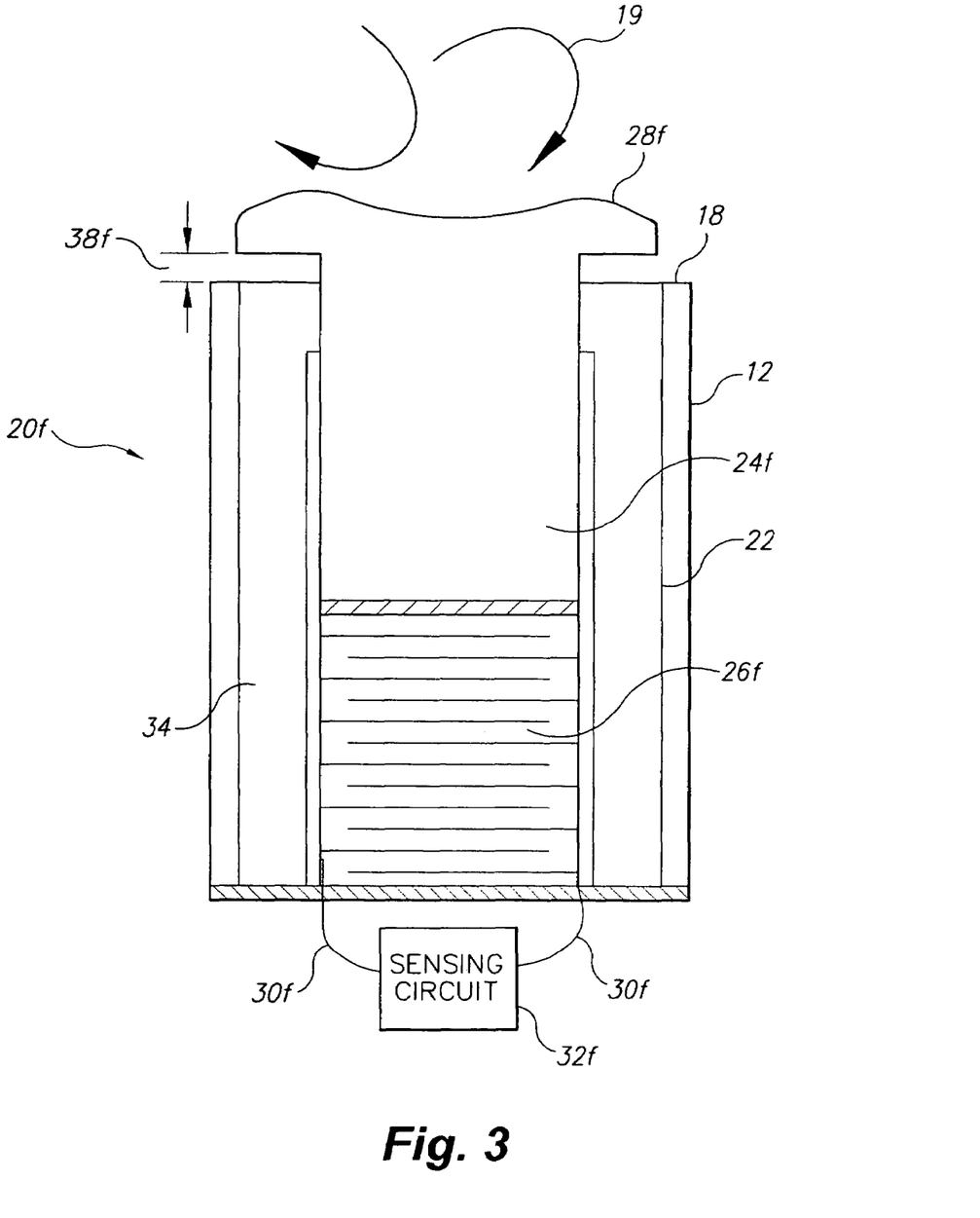
FIG. 3 is a diagrammatic view of a force sensor with a ceramic, piezoelectric transducer for a flow meter probe with force sensors according to the present invention.

FIG. 3 shows a first embodiment of a force sensor, designated as sensor 20f. In this embodiment, the transducer is a piezoelectric ceramic transducer 26f disposed in the base of bore 22. Pin 24f is axially movable in bore 22 to exert pressure against piezoelectric transducer 26f to produce a voltage (or an oscillating voltage) at a magnitude (or frequency) proportional to the force exerted by displacement of pin 24f in bore 22 due to aerodynamic or hydrodynamic force exerted on the head 28f of pin 24f. Transducer 26f is connected by appropriate electrical conductors 30f to a sensing circuit 32f, which, in turn, may be connected to a data processor for analyzing the measurement.

A cylindrical gasket 34 lines the bore 22 to guide movement of the pin 24f and to provide a seal that prevents gas or liquid from the fluid field from entering the bore 22 and collecting along the sides or bottom of the pin 24f. Pin 24f may be somewhat resilient and may be lubricated at the interface between the body of the pin 24f and the gasket 34. The head 28f of pin 24f has a peripheral flange 36f that is separated or raised above gasket 34 and face 18 by a micrometer gap 38f to allow for displacement of the head 28f while preventing the pin 24f from sliding too far into bore 22.

Figure 5:
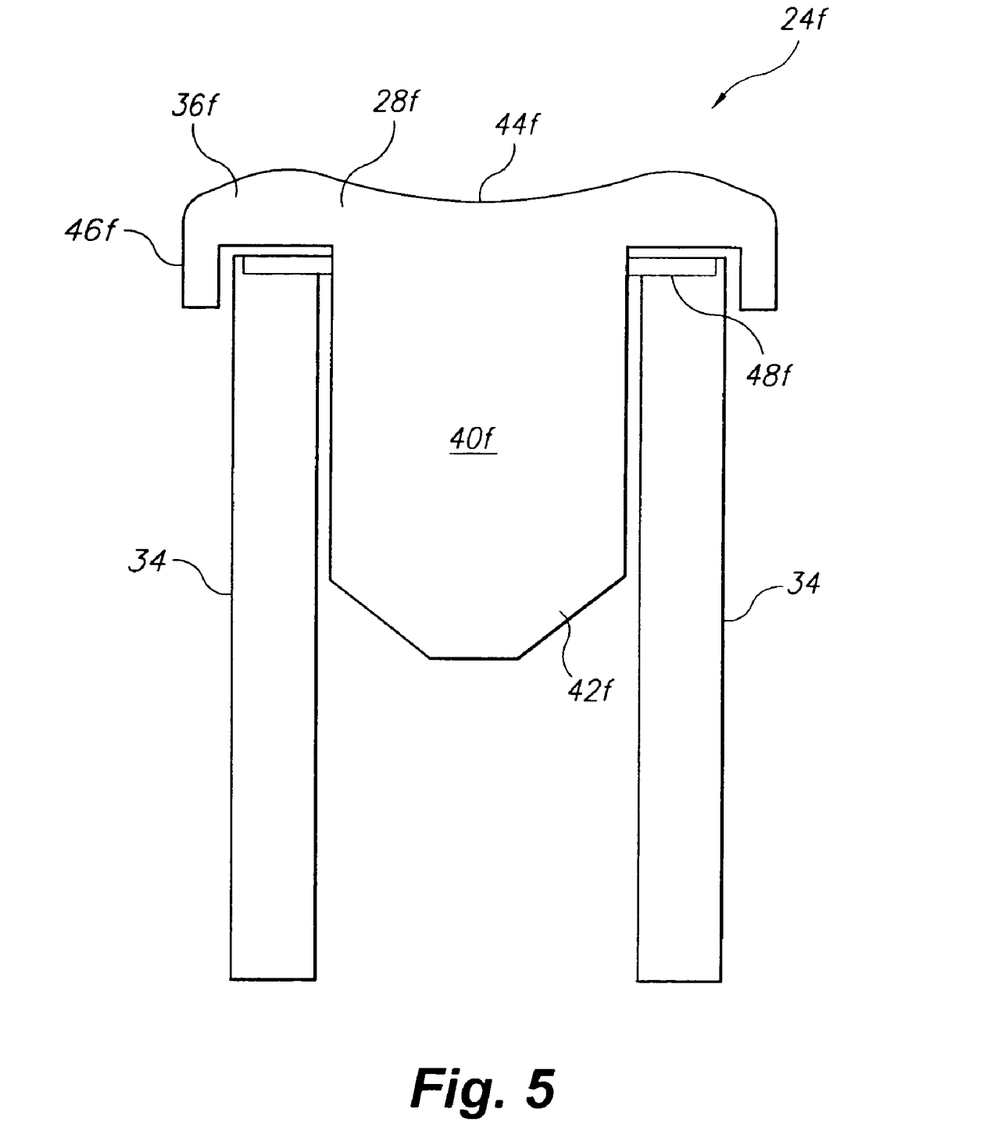
FIG. 5 is a diagrammatic detail side view of a force sensor pin for use with a ceramic, piezoelectric transducer of a flow meter probe with force sensors according to the present invention.

FIG. 5 shows pin 24f in greater detail. Pin 24f has a head 28f, an elongated, cylindrical body 40f, and a tail 42f. Tail 42f is preferably frustoconical in shape in order to concentrate force generated by displacement of pin 24f against the piezoelectric transducer 26f. The head 28f has a shallow, concave, centrally-located recess 44f defined therein to provide an aerodynamically- and hydrodynamically-shaped head to increase the pressure drag force exerted against the pin 24f while minimizing the production of eddies and other fluid flow disturbances. The head 28f may have a peripheral lip 46f depending from peripheral flange 36f, if desired. An O-ring 48f may be disposed around pin body 40f immediately below head 28f to seat on top of gasket 34 in order to provide further sealing of the bore 22, if desired.

Figure 4:
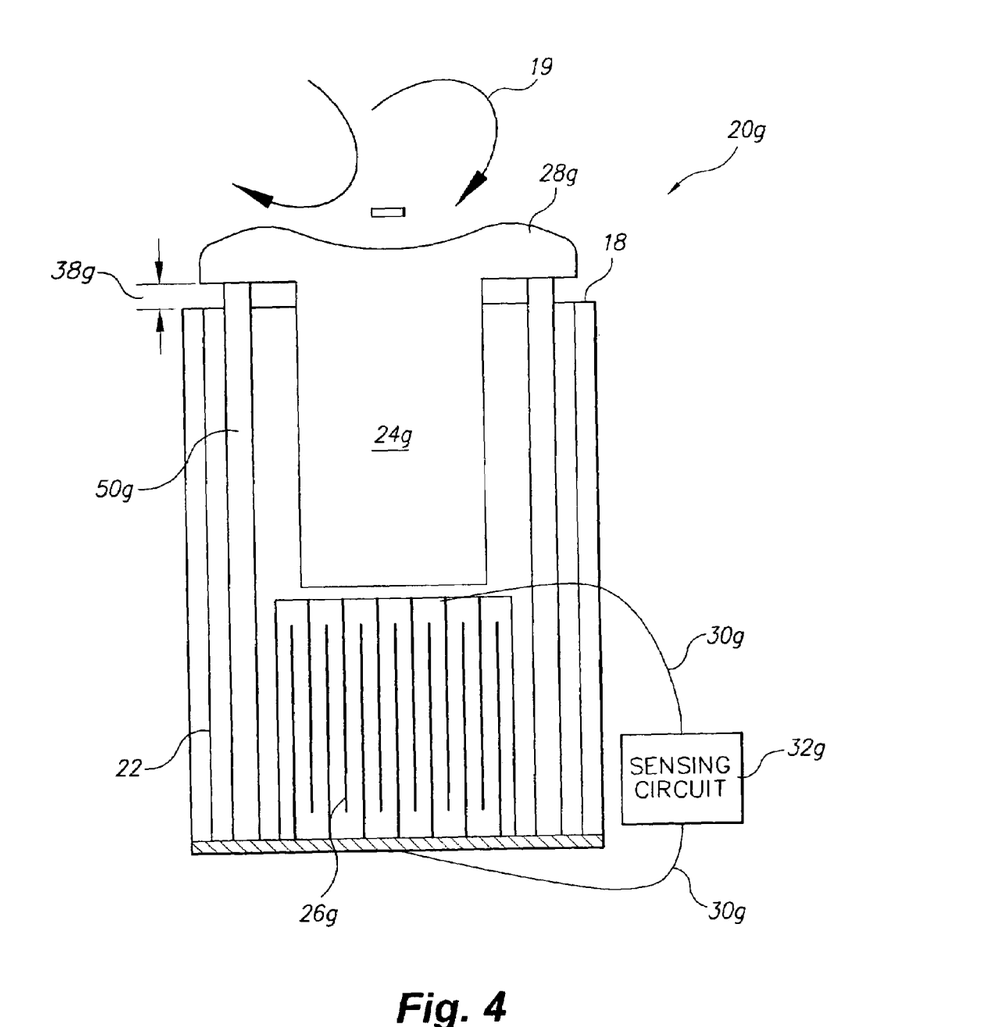
FIG. 4 is a diagrammatic view of a force sensor with a MEMS transducer for a flow meter probe with force sensors according to the present invention.

FIG. 4 shows an alternative embodiment of a force sensor 20 for use in probe 10, designated as sensor 20g. Force sensor 20g has a Micro-Electro-Mechanical System (MEMS) transducer 26g disposed in the base of bore 22. The MEMS transducer 26g has a plurality of engaged interdigital fingers and mechanical springs. Movement of the fingers towards each other results in a change in electrical charge, which can be measured to quantify displacement of pin 24g in bore 22. Thus, the MEMS transducer 26g produces an electrical signal proportional to displacement of pin 24g in bore 22 due to aerodynamic or hydrodynamic forces exerted against the head 28g of pin 28g by flow field 19. The electrical signal produced by MEMS transducer 26g is communicated to sensing circuit 32g by conductors 30g. Sensing circuit 32g may, in turn, be connected to a data processor for analyzing the measurements.

Figure 6:
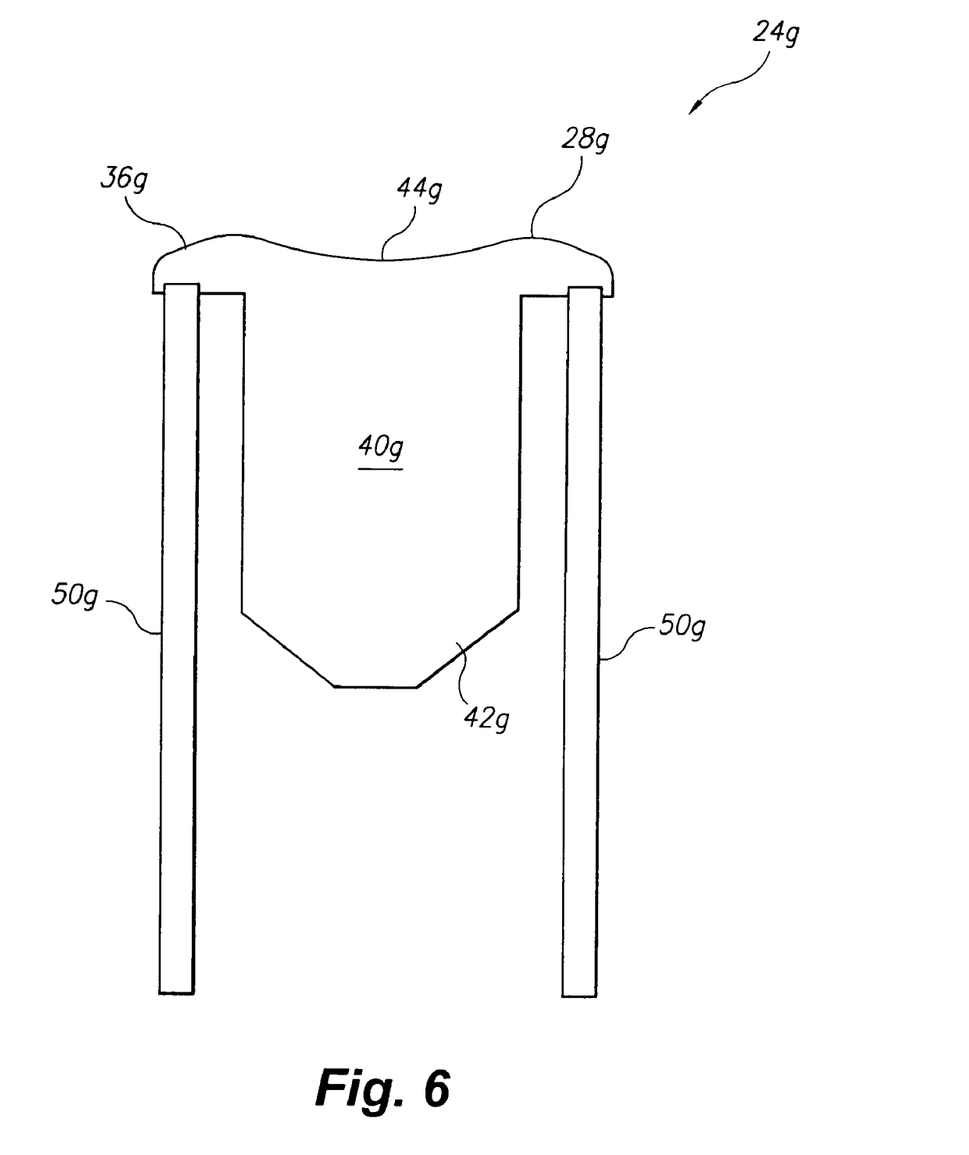
FIG. 6 is a diagrammatic detail side view of a force sensor pin for use with a MEMS transducer of a flow meter probe with force sensors according to the present invention.

Pin 24g may be supported by a mechanical spring 50g. Referring to FIG. 6, pin 24g has a head 28g, an elongated cylindrical body 40g, and a tail 42g. Tail 42g may have a frustoconical shape for increasing or decreasing the pressure (depending upon the size of the frustum) exerted against MEMS transducer 26g by displacement of pin 24g in bore 22. The body 40g of pin 24g is concentrically disposed within mechanical spring 50g, which may have a cylindrical shape for uniformity and to provide sealing of the bore 22 against the body 40g of pin 24g.

The head 28g of pin 24g has a peripheral flange 36g that bears against the top or upper end of spring 50g. The peripheral flange 36g may be separated or raised above bore 22 and face 18 by a micrometer gap 38g to allow for displacement of the head 28g while preventing the pin 24g from sliding too far into bore 22. The head 28g also has a shallow, concave, centrally-located recess 44g defined therein to provide an aerodynamically- and hydrodynamically-shaped head to increase the pressure drag force exerted against the pin 24g while minimizing the production of eddies, cavitation, and other fluid flow disturbances.

Figure 7:
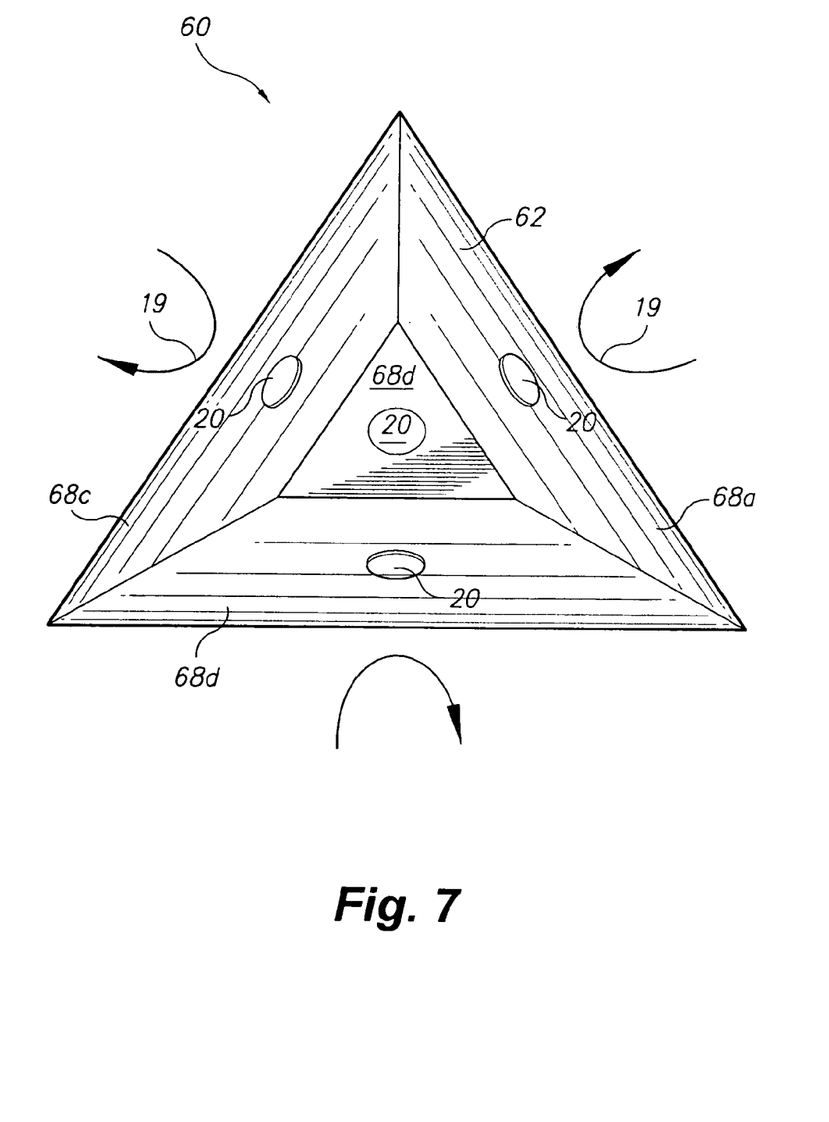
FIG. 7 is a top view of an alternative embodiment of a flow meter probe with force sensors according to the present invention.

FIG. 7 shows an alternative embodiment of a flow meter probe with force sensors according to the present invention, designated generally as 60 in the drawing. Probe 60 has a body 62 having the shape of a frustum of a regular pyramid, in this case, a triangular pyramid. The body 62 has four faces 68a, 68b, 68c, and 68d exposed to the fluid field. Each of the faces 68a-68d has a force sensor 20 disposed thereon. The force sensors 20 may have a transducer of the piezoelectric type, as in force sensor 20f, or of the MEMS type, as in force sensor 20g.

It will be understood that a flow meter probe of the present invention may have a regular frustopyramidal shape of any type, with the base of the pyramid having any desired polygonal shape, with a corresponding number of faces exposed to the fluid flow field, the probe having at least three force sensors and preferably with each face having a force sensor disposed thereon. This structure helps in isolating each force sensor, and hence minimizes flow disturbance effects on each sensor. It will also be understood that the ceramic piezoelectric transducer and the MEMS transducer are exemplary, so that the force sensor of a flow meter probe of the present invention may have any type of transducer producing an electrical signal proportional to displacement of the pin in the probe body due to aerodynamic or hydrodynamic force exerted against the head of the pin at the surface of the probe body.

Figure 8A:
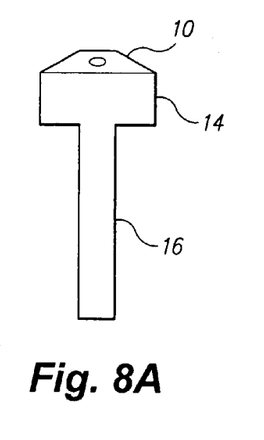
FIG. 8A is side view of a single flow meter probe with force sensors according to the present invention.
Figure 8B:
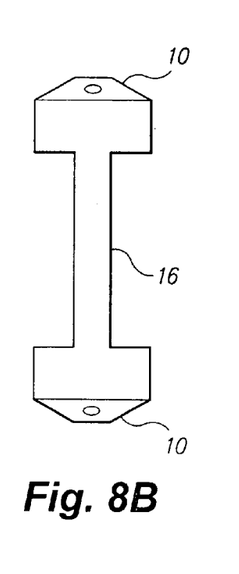
FIG. 8B is a side view of a pair of flow meter probes with force sensors according to the present invention joined by a shaft.
Figure 8C:
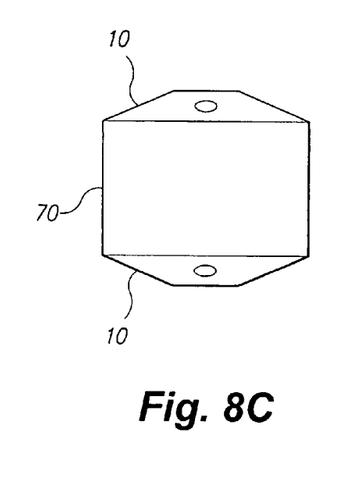
FIG. 8C is a side view of a pair of flow meter probes with force sensors according to the present invention joined by a solid body.
Figure 8D:
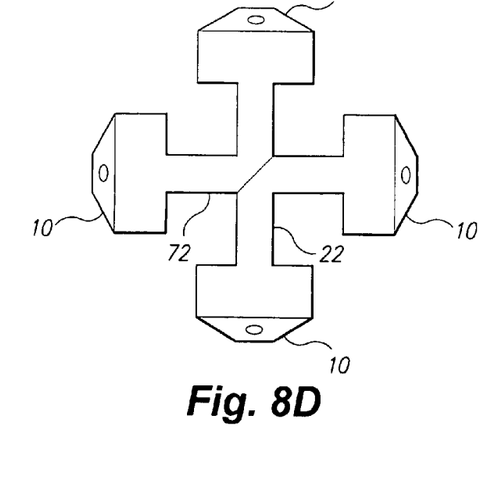
FIG. 8D is a side view of four flow meter probes with force sensors according to the present invention joined by a pair of orthogonal shafts.

A flow meter probe with force sensors according to the present invention may be deployed in a fluid flow field in any desired number or configuration. FIG. 8A shows a single probe 10 disposed on a platform 14 supported by a shaft 16, similar to FIG. 1. FIG. 8B shows a pair of probes 10 disposed 180° apart on a single shaft 16. FIG. 8C shows a pair of probes 10 disposed 180° apart at opposite ends of a solid body, such as a square or rectangular post 70 having the same cross-sectional dimension as the base of the probe body 12. FIG. 8D shows four probes 10 disposed 90° apart, being mounted at opposite ends of a pair of orthogonal shafts 72.

Figure 9:
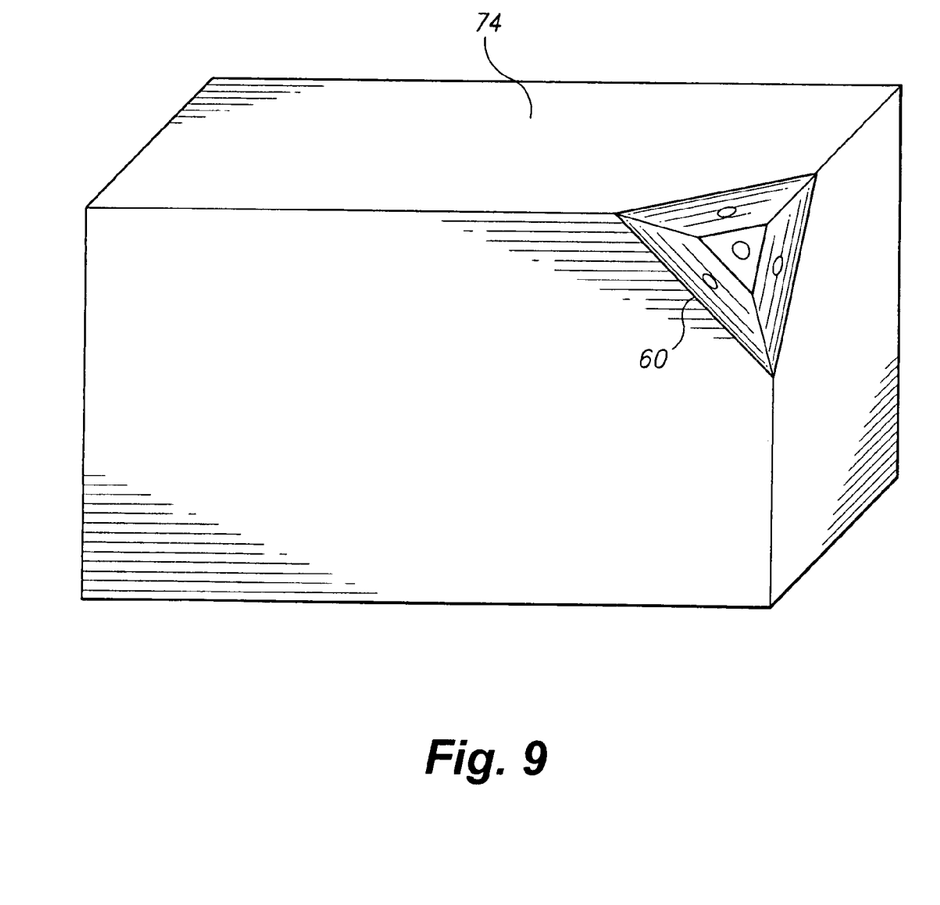
FIG. 9 is a perspective view of a triangular flow meter probe with force sensors according to the present invention mounted on a corner of a box-shaped device.

Further, a flow meter probe with force sensors according to the present invention may be mounted on any desired structure. FIG. 9 shows a triangular flow meter probe 60 mounted on a corner of a rectangular parallelepiped, e.g., a box 74. Further, the force sensors 20 or probes 10 may be embedded in the internal walls of reactor vessels and mixing chambers for measuring velocity vector components for internal fluid flow fields.

It is contemplated that a flow meter probe with force sensors can be used in any fluid flow path or field where it is desired to measure a velocity vector, aerodynamic or hydrodynamic forces, or other flow parameters. Thus, the probe may be used for such diverse applications as the operation and monitoring of petrochemical plants, weather monitoring and forecast, air-transportation traffic control, electronic cooling, and biomedical engineering applications, among others.

It is to be understood that the present invention is not limited to the embodiments described above, but encompasses any and all embodiments within the scope of the following claims.

We claim:

1. A flow meter probe with force sensors, comprising:
   a probe body shaped as a frustum of a regular pyramid, the probe body having a plurality of faces having a bore defined therein; and
   a plurality of force sensors, each of the bores having one of the force sensors mounted therein, each of the force sensors having:
      a pin axially slidable in the corresponding bore in which the force sensor is mounted, each of the pins having a head at the corresponding face of the probe body adapted for exposure to a fluid field; and
      a transducer seated in the corresponding bore below the pin, each of the transducers producing an independent electrical signal proportional to axial displacement of the pin in the corresponding bore;
   wherein the faces having the force sensors mounted therein are oriented in at least three mutually orthogonal directions so that the electrical signals generated by the transducers correspond to vector components of a fluid dynamic force and velocity exerted against the heads of the pins by the fluid field.

2. The flow meter probe according to claim 1, wherein said probe body comprises a frustum of a triangular pyramid having four faces with said force sensors mounted therein.

3. The flow meter probe according to claim 1, wherein said probe body comprises a frustum of a square pyramid having five faces with said force sensors mounted therein.

4. The flow meter probe according to claim 1, wherein said transducer comprises a ceramic piezoelectric transducer.

5. The flow meter probe according to claim 4, wherein each of said pins has an elongated body extending from the head, the body being axially slidable in the bore, the body being flexible and lubricated.

6. The flow meter probe according to claim 5, further comprising a cylindrical gasket disposed in each of the bores, the body of said pins being slidable in the gasket, the gaskets providing a seal between said pins and said probe body.

7. The flow meter probe according to claim 6, further comprising an O-ring disposed around the body of each of said pins and seated at an upper end of the gaskets below the head of said pins, the O-rings providing a further seal between said pins and the gaskets.

8. The flow meter probe according to claim 1, wherein said transducer comprises a Micro-Electro-Mechanical System (MEMS) transducer.

9. The flow meter probe according to claim 8, wherein each of said pins has a peripheral flange extending around the head of said pin and a body extending from the head, the probe further comprising a cylindrical mechanical spring disposed in each of said bores encircling the body of said corresponding pin and said MEMS transducer, the peripheral flange bearing against said mechanical spring.

10. The flow meter probe according to claim 1, wherein the head of each of said pins has a shallow, concave, centrally-located recess defined therein for maximizing aerodynamic and hydrodynamic drag forces and minimizing production of eddies, turbulence and flow disturbances.

11. The flow meter probe according to claim 1, wherein each of said pins has an elongated, cylindrical body extending from the head and a tail extending from the body opposite the head, the tail being frustoconical in shape in order to concentrate and adjust pressure applied against said transducers by displacement of said pins.

12. The flow meter probe according to claim 1, wherein the head of each of said pins is raised above the corresponding face of said probe body, defining a micromillimeter gap therebetween, in order to expose the head directly to aerodynamic and hydrodynamic forces exerted by the fluid field.

13. A flow meter probe with force sensors, comprising:
a probe body shaped as a frustum of a regular pyramid, the probe body having a plurality of faces having a bore defined therein; and
a plurality of force sensors, each of the bores having one of the force sensors mounted therein, each of the force sensors having:
a pin axially slidable in the corresponding bore in which the force sensor is mounted, each of the pins having a head at the corresponding face of the probe body adapted for direct exposure to forces exerted by a fluid field; and
means for measuring axial displacement of the pin in the corresponding bore;
wherein the faces having the force sensors mounted therein are oriented in at least three mutually orthogonal directions in order to compute vector components of a fluid dynamic force and velocity exerted against the heads of the pins by the fluid field.

14. The flow meter probe according to claim 13, wherein said probe body comprises a frustum of a triangular pyramid having four faces with said force sensors mounted therein.

15. The flow meter probe according to claim 13, wherein said probe body comprises a frustum of a square pyramid having five faces with said force sensors mounted therein.

16. The flow meter probe according to claim 13, wherein said measuring means comprises a ceramic piezoelectric transducer seated in the corresponding bore below said pin, said pin having a tail opposite the head, the tail bearing against the transducer, the transducer generating an electrical signal proportional to axial displacement of said pin resulting from aerodynamic and hydrodynamic forces exerted again the head of said pin by the fluid field.

17. The flow meter probe according to claim 13, wherein said measuring means comprises a Micro-Electro-Mechanical System (MEMS) transducer seated in the corresponding bore below said pin, said pin having a tail opposite the head, the tail bearing against the transducer, the transducer generating an electrical signal proportional to axial displacement of said pin resulting from aerodynamic and hydrodynamic forces exerted again the head of said pin by the fluid field.

18. The flow meter probe according to claim 13, wherein said pin has an elongated, cylindrical body extending from the head and a tail extending from the body opposite the head, the tail being frustoconical in shape in order to concentrate and adjust pressure applied against said transducer by displacement of said pin, the head of said pin having a shallow, concave, centrally-located recess defined therein for maximizing aerodynamic and hydrodynamic drag forces and minimizing production of eddies, turbulence and flow disturbances, the head of each of said pin being raised above the corresponding face of said probe body, defining a micromillimeter gap therebetween, in order to expose the head directly to aerodynamic and hydrodynamic forces exerted by the force field.

19. A flow meter probe, comprising:
a body having a plurality of bores defined therein oriented in at least three mutually orthogonal directions; and
a plurality of force sensors, each of the bores having a corresponding one of the force sensors mounted therein, each of the force sensors having:
a pin axially slidable in the corresponding bore in which the force sensor is mounted, each of the pins having a head having a peripheral flange raised above the body to define a micromillimeter gap between the head of the pin and the body; and
means for producing an independent electrical signal proportional to axial displacement of the pin in the corresponding bore;
whereby aerodynamic and hydrodynamic forces exerted against the head of the pin generate independent electrical signals corresponding to vector components of forces and velocities of a fluid field.

20. The flow meter probe according to claim 19, wherein said producing means is selected from the group consisting of a ceramic piezoelectric transducer and a Micro-Electro-Mechanical System (MEMS) transducer, the transducer being seated in the corresponding bore so that axial displacement of the pin in the bore generates a corresponding pressure against the transducer in order to produce an electrical signal proportional to aerodynamic and hydrodynamic forces exerted against the head of said pin in the fluid flow field.

* * * * *